United States Patent [19]

Hamrick

[11] Patent Number: 5,451,998
[45] Date of Patent: Sep. 19, 1995

[54] HOME SHOPPING VIDEO CATALOG

[76] Inventor: Daniel C. Hamrick, 1405 El Dorado #203, Boise, Id. 83704

[21] Appl. No.: 222,686

[22] Filed: Apr. 4, 1994

[51] Int. Cl.⁶ .......................... H04N 7/00; H04N 7/10; H04N 7/14
[52] U.S. Cl. .......................................... 348/13; 348/1; 348/7; 348/10; 348/14; 348/17; 348/5; 364/401; 364/403
[58] Field of Search ................... 348/7, 10, 12, 13, 14, 348/16, 17, 1, 5; 364/401, 403; H04N 7/00, 7/10

[56] References Cited

U.S. PATENT DOCUMENTS

| | | | |
|---|---|---|---|
| 4,734,764 | 3/1988 | Pocock et al. | 358/86 |
| 4,876,592 | 10/1989 | Von Kohorn | 358/84 |
| 4,984,155 | 1/1991 | Geier et al. | 348/401 |
| 5,128,752 | 7/1992 | Von Kohorn | 358/84 |
| 5,191,410 | 3/1993 | McCalley et al. | 348/13 |
| 5,231,566 | 7/1993 | Blutinger et al. | 364/401 |
| 5,249,044 | 9/1993 | Von Kohorn | 358/86 |
| 5,285,278 | 2/1994 | Holman | 348/5 |
| 5,287,181 | 2/1994 | Holman | 348/1 |

*Primary Examiner*—James J. Groody
*Assistant Examiner*—Nina M. West
*Attorney, Agent, or Firm*—Ken J. Pedersen; Barbara S. Pedersen

[57] ABSTRACT

This invention is an apparatus and method for shopping at home. The apparatus comprises a video catalog in which a plurality of product images are established, each product image being coordinated with a corresponding product identification in an order form. The video catalog and the order form are distributed to prospective customers. The customers may view the video catalog and product images, and select the corresponding identification of desired product(s) in the order form. Then, to place an order, the customer transmits the order form with the product identification(s) to the merchandiser, by phone, mail or electronic transmission, for example. Then, the merchandiser may arrange for payment of the order by the customer, and delivery of the corresponding product(s) to the customer.

14 Claims, 3 Drawing Sheets

HOME SHOPPING VIDEO CATALOG

BACKGROUND OF THE INVENTION

1. Field of the Invention

This invention relates generally to an apparatus and method for shopping at home. More specifically, it relates to a video catalog which is coordinated with an order form, and, optionally, a phone ordering system and home delivery network. The video catalog may display moving or still images, or a combination thereof.

2. Related Art

There has been a trend in consumer marketing to emphasize customer convenience. For instance, working couples, the physically challenged and the elderly can all benefit from shopping services that maximize convenience. Also, smart marketers can profit by supplying the benefit of convenience to these shoppers.

Several types of at-home shopping services exist. First, many businesses provide, in their printed advertising, mail-in or phone-in forms for their customers' use. So, printed order forms appear in newspapers and magazines, and in brochures, "flyers" and pamphlets. Second, many businesses provide printed catalogs with mail-in or phone-in forms enclosed. Third, some businesses provide video-taped presentations of their products. Finally, some businesses advertise their products on T.V. or radio with an accompanying announcement of a mail-in address or a phone-in telephone number.

VonKohorn, U.S. Pat. No. 4,876,592, discloses a broadcast quiz-type merchandizing T.V. program which encourages participation of the remote audience in the program. Participation of the remote audience may be by phone or by keyboard. Sales information is included in the broadcast, and award certificates are made available to the audience, encouraging telephonic purchasing of merchandise.

VonKohorn, U.S. Pat. No. 5,128,752, discloses a broadcast system for displaying merchandise information on a T.V. and generating coupons with a home generating unit. Information regarding the coupons may be stored in the home generating unit for later review by marketing and manufacturing companies. The coupons may be presented to stores for prizes and/or discounts on selected products.

Blutinger et al., U.S. Pat. No. 5,231,566, discloses a computer system for assigning a catalog item number to items that are to be listed in the catalog. The computer executes a program which compares an input item to a master list—if the input item is on the master list, the number on the list is assigned to the input item; if the input item is not on the master list, a new catalog item number is generated and assigned to the input item. This way, each unique item has a corresponding unique catalog number.

VonKohorn, U.S. Pat. No. 5,249,044, also discloses a broadcast system for generating coupons with a home generating unit. In this patent, the information stored in the home generating unit, including product information, may be transmitted back to the T.V. for viewing.

SUMMARY OF THE INVENTION

This invention is an apparatus and method for shopping at home. The apparatus comprises a video catalog in which a plurality of product images are established, each product image being coordinated with a corresponding product identification in an order form. The video catalog and the order form are distributed to prospective customers. The customers may view the video catalog and product images, and select the corresponding identification of desired product(s) in the order form. For example, the order form may be a paper form or an image displayed on a video-tape playing device or computer video screen, or may be an electronic or computer data file, etc. Then, to place an order, the customer transmits the order form with the product identification(s) to the merchandiser, by phone, mail, fax or modem, for example. Then, the merchandiser may arrange for payment of the order by the customer, and delivery of the corresponding product(s) to the customer.

Preferably, the video catalog is provided with a still image or "freeze-frame" feature so an individual product image may be conveniently viewed. The still images may be interspersed with moving images to establish mood, emotion or ambiance. Audio, such as voices or music, may be included to explain the products or enhance the video shopping experience. Also preferably, the product images may be arranged in order by the merchandiser to depict the atmosphere and layout of the merchandiser store locations, if any. An effect which may be created is one of walking into and through the local supermarket. This way, the merchandiser may strengthen its identity with new customers by increasing the new customers' familiarity with the merchandiser's goods and services and particular style of doing business. Also this way, the merchandiser may benefit from its established good will by helping its regular customers feel more at home with the new video home shopping service.

Also preferably, the product identifications in the order form are organized and indexed for quick reference by the customer. This way, the customers' convenience may be further enhanced. For example, the order form may contain an alphabetical listing of products by product category and name, like "Cereals—Special K ®". Listed with the product name may be a short description of available sizes and prices, for example, and the product's identification for ordering purposes.

DESCRIPTION OF THE PREFERRED EMBODIMENTS

Figure 1:
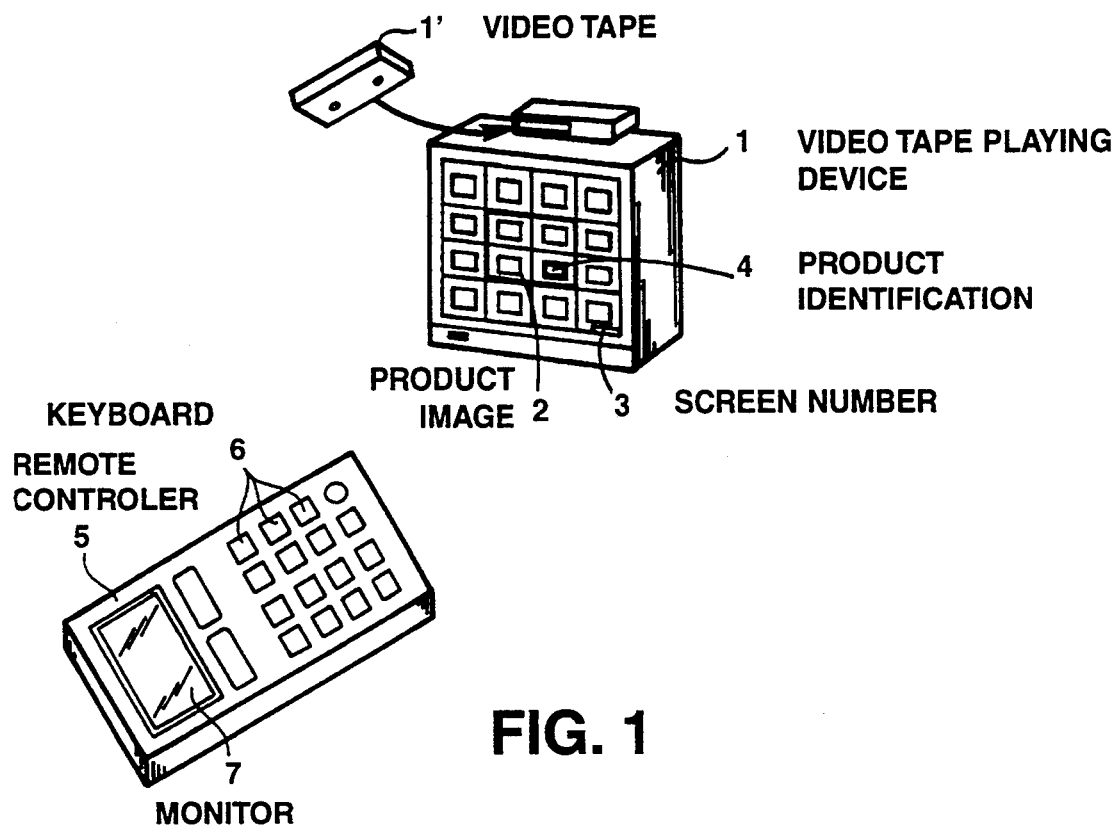
FIG. 1 is a schematic, composite perspective view of a video-tape playing device according to one embodiment of the invention, and an optional remote control device. A product image is depicted on the screen of the video-tape playing device.

Referring to the Figures, there is depicted in FIG. 1 the component parts and some optional parts of one embodiment of the invention. First, there is a conventional video-tape playing device 1, which may be a T.V. with a VHS/VCR tape player, or a computer with video monitor and compact disk like a CD ROM, or any display device for video-tape or disk. For example, video-tape is depicted as item 1' in FIG. 1. Playing device 1 has the capability to display a product image 2, for example, on its screen as shown. Product image 2 may be displayed alone or with other product images, and it may be depicted in motion or in still-frame. Product image 2 may contain a visual representation of the shape, color and design of the product or product packaging. In addition, short textual description, available sizes and prices may be displayed. The product identification for ordering purposes may also be displayed.

For each still-frame screen display, there is a corresponding screen identifier, or screen number 3, like a tape counter. The screen number 3 permits quick and convenient call-up of the particular still-frame screen display. The screen number 3 for each frame on the videotape is known and recorded. This way, an address is created for calling up on the screen of playing device 1 the particular screen display. This address may be accessed electronically for computer retrieval, transfer and display.

Also, for each product image 2, whether there is one or more in each still-frame screen display, there is a corresponding product identification 4, which is displayed at the same time as, and in close proximity on the screen of playing device 1 to, the particular product image 2. Product identification 4 may be a number, an alphabetical code, or an alphanumeric code. For each unique product the merchandiser has to sell, there is a unique product identification 4 for ordering purposes. Product identification 4 may be the same as the merchandiser's stock number, but need not be, and it may be the same identification the merchandiser uses for inventory purposes, but need not be.

Optionally, the product name corresponding to each product image may also be recorded in the video catalog. Optionally, the product name may also be displayed in close proximity to each product image.

Playing device 1 may be remotely operated by optional remote controller 5, which may have a keyboard or buttons 6 for controlling operation of the playing device 1. This way, the functions "on", "off", "forward", "fast forward", "reverse", "fast reverse", "pause", "eject", etc. may be remotely initiated in playing device 1. Remote controller 5 may also have a screen or monitor 7 for displaying information from playing device 1, for example, the function in operation, screen identifier number 3, product identification number 4, or other information.

Remote controller 5 may contain a computer which is programmed to respond to information, such as search and order commands, input to it through, for example, buttons 6. These search and order commands initiate other functions of playing device 1, for example, the searching and ordering functions of "go to", "find", and "order". These searching and ordering functions interact with the video catalog to search for and go to particular screen numbers, product identifications, or product names, or to record which product names or identifications the customer wishes to order. The information input into the remote controller computer may be in code, but it relays specific instructions for playing device 1, such as "go to (screen number)", "find (product name)", and "order (product identification)". For example, the playing device 1 may be instructed to display screen number 425 by inputting via buttons 6 the code "go to", "#1", "425", where "#1" is the code for screen number. Or, the playing device 1 may be instructed to display product number 7659 by inputting via buttons 6 the code "find", "#2", "7659", where "#2" is the code for product identification. Or, the playing device 1 may be instructed to display the screen for cereals, or the first display screen number for cereals, etc., by inputting the code "find", "cereals". Alternatively, the computer that is programmed for these searching and ordering control functions, may also be located in playing device 1, thus making them local control functions.

Playing device 1 plays a VCR cassette or compact disk (CD). The cassette or disk contains a plurality of product images 2 representing products available for purchase. The collections and organization of the product images make up a video catalog. By "video catalog", I mean a collection of product images 2 that may be displayed for the customer's viewing with the aid of an electric or electronic device, like a VCR for video cassette tape, or a CD ROM for video compact disk.

The images of the video catalog may be displayed as moving images, still images, or as a combination of moving and still images. This way, the presentation of the video catalog may be customized according to the merchandiser's desires. For example, the merchandiser may intersperse still images of particular products or serving suggestions for the products with moving images of the merchandiser's storefront, entryway, aisles and display cases to create a sense of familiarity and comfort in the viewers who are familiar with the merchandiser's store locations. This way, video shoppers can "walk down" the aisles and select products for purchase—just as if they were in the merchandiser's store.

Another example of customization would be adding moving image demonstrations or audio discussions of all or some of the products to a separate section in the video catalog. The customer could view consecutive product images in the video catalog, like browsing through a printed catalog, and then, for particular products of interest, the customer could fast forward through the video catalog to the demonstration of the particular product, or could use the searching functions to find the demonstration. For example, the demonstration of product 7659 could be displayed by the playing device 1 by inputting via buttons 6 the code "find" "#3""7659", where "#3" is the code for demonstrations.

The still images may be created by any conventional means. If playing device 1 is a four-head type VCR, for example, it may have available from the manufacturer a "freeze-frame" feature. For two-and three-head type VCR's, the image freeze modulator depicted in FIGS. 3 and 4 may be utilized to create the still images.

Figure 3:
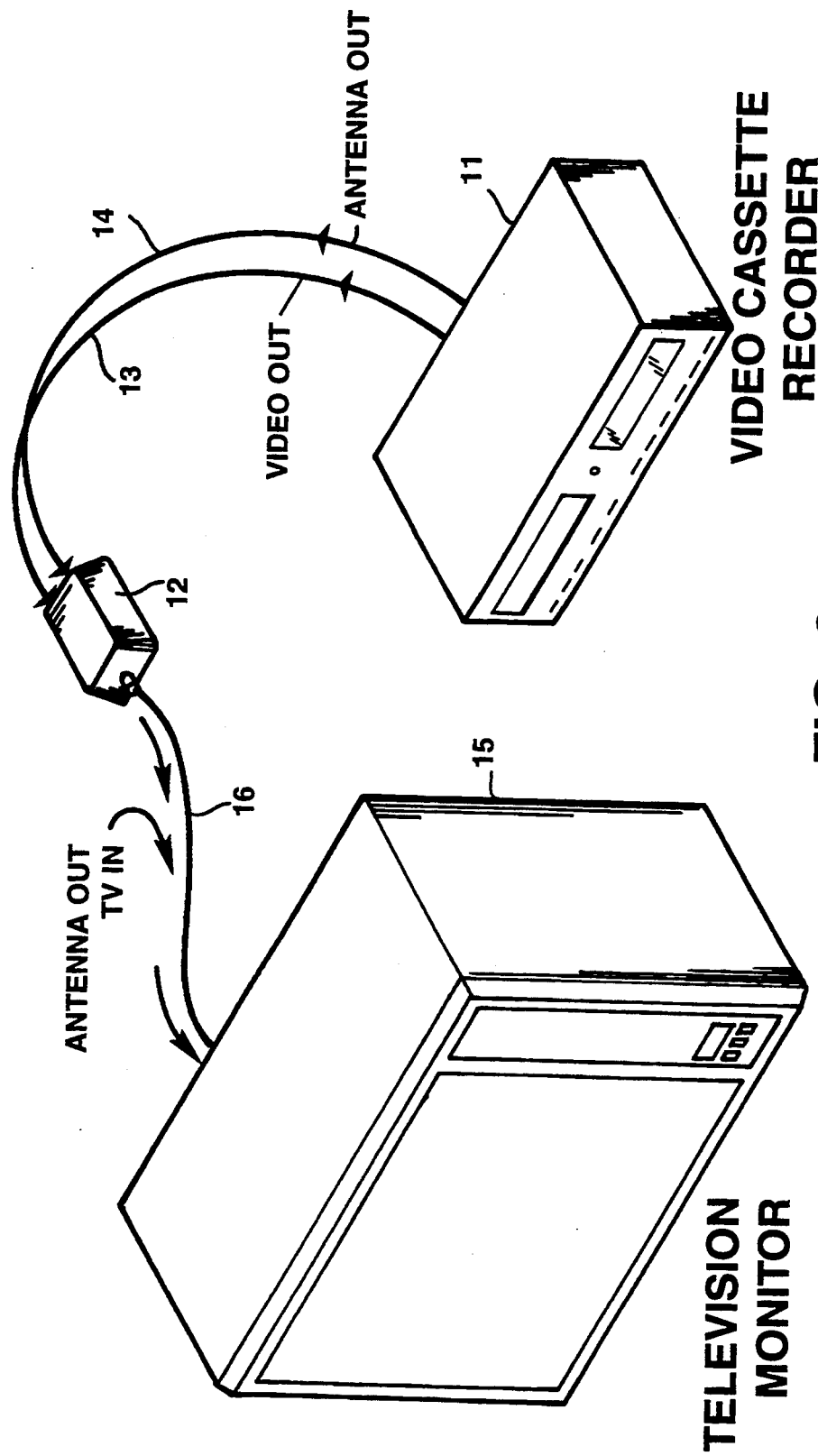
FIG. 3 is a schematic perspective view of a video-tape playing device according to one embodiment of the invention, with an optional image freeze modulator for a "freeze frame" feature. The modulator is connected between a video cassette recorder and a television monitor in this figure.

In FIG. 3, two- or three-head VCR 11 is connected to image freeze modulator 12 with two wires, video out wire 13 and antenna out wire 14. Modulator 12 is connected to television monitor 15 with one wire, antenna out/TV in wire 16. Wire 16 is connected to the ANTENNA IN port of television monitor 15.

Figure 4:
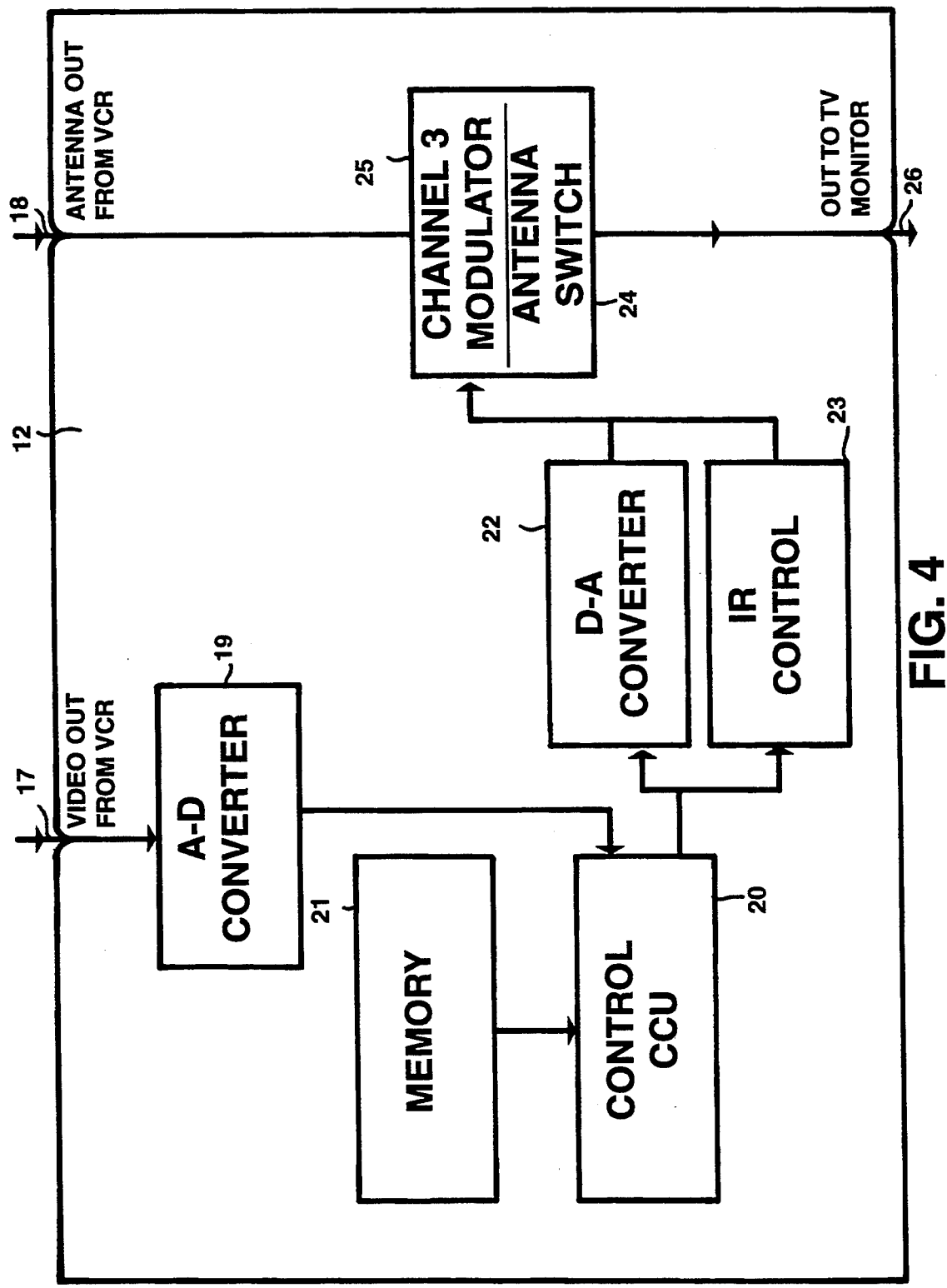
FIG. 4 is a schematic diagram of the internal components of the image freeze modulator depicted in FIG. 3.

The internal components of image freeze modulator 12 are depicted in FIG. 4. Video out from VCR port 17 receives video out wire 13 from FIG. 3. Likewise, antenna out from VCR port 18 receives antenna out wire 14 from FIG. 3. Port 17 is connected to A-D (analog-digital) converter 19, which is serially connected to Control CCU (computer control unit) 20. A-D converter 19 changes the incoming electrical signal to modulator 12 from the analog type (amplitude and frequency) to the digital type (on-off). CCU 20 has attendant memory storage 21. Storage 21 has data that enables CCU 20 to instruct the camera to proceed at about 30 frames per second when operating in the moving image mode. When operating in the still image mode, storage 21 has data that enables CCU 20 to instruct the camera to display one or several frames of the still image, then "fast reverse" to the first still image frame for displaying it again, repeating this procedure as long as the CCU 20 is in the still image mode.

CCU 20 is connected in parallel to D-A (digital-analog) converter 22 and to IR (infra-red receiver) control 23. D-A converter 22 changes the outgoing electrical signal from modulator 12 from the digital type (on-off) back to the analog type (amplitude and frequency).

IR control 23 interacts with remote controller 5 to adjust the output of CCU 20 responsive to the input, for example, via buttons 6.

Order form 8 corresponds to a specific video-tape for the playing device 1. Order form 8 contains product information which corresponds to the plurality of product images 2 in the video catalog. By referring to order form 8, the customer may establish the product identification 4 of any particular product image 2.

A library of order forms may be created to correspond to a library of video catalogs. The order forms 8 may be printed, and filled in by hand by the customer for return to the merchandiser. Or, order forms 8 may be an electronic record created by electronic interaction of the customer with the order form. This electronic interaction may be, for example, the customer inputting via buttons 6 the code "order" followed by the product identification 4 or the product name. The electronic order form may be stored, for example, in the computer memory of the remote controller 5, computer memory contained the display device 1, or other computer memory or storage. The order form, then, correlates the customer's choice of products to be purchased as selected by their product image 2, with their identification 4.

Preferably, order form 8 has a section listing available products organized in alphabetical or numerical order, or some other convenient order from the customers' point of view. For example, the order form may contain an alphabetical listing of products by product category and name, like "Cereals— Special K ®". Listed with the product name may be a short description of available sizes and prices, for example, and the product's identification for ordering purposes. This way, the screen number 3 or product identification 4 corresponding to a particular product or product image 2 may be conveniently located. Also, order form 8 has a section for recording desired product identification numbers so they may be transmitted to the merchandiser. Order form 8 may be printed by the merchandiser and distributed to the customers to be filled in by the customers. Or, order form 8 may be printed by the customer, either manually, or, for example, by remote controller 5. Or, the order form may be included as an order form image in the video catalog to be displayed on the display device. This order form image may be "filled in" by the electronic interaction of the customer with the remote controller or other computer, either by entering order commands that are stored only in the memory of the computer or that are stored in the memory but also displayed as check marks or notations, for example, on the order form image. In any event, a record of the customer's order is created, and the information in it is transmitted to the merchandiser's order-taking facility, by mail, phone 9, or electronic transmission, for example.

Product identification 4 assists in easy ordering of goods and services. Product identification 4 may be transmitted easily, even in code, to the merchandiser. For example, the customer may call the merchandiser, or a centralized order-taking facility, and recite over the optional telephone to an operator the product identification 4 for the desired products. Or, the customer may call the merchandiser's order-taking facility, and input via the telephone push-buttons the product identification 4 directly into the merchandiser's order-taking program. Or, the customer may select and order product(s) with an embodiment of remote controller 5 in which a direct communications link between controller 5 and the merchandiser's order-taking facility is established, for example, by a modem.

Figure 2:
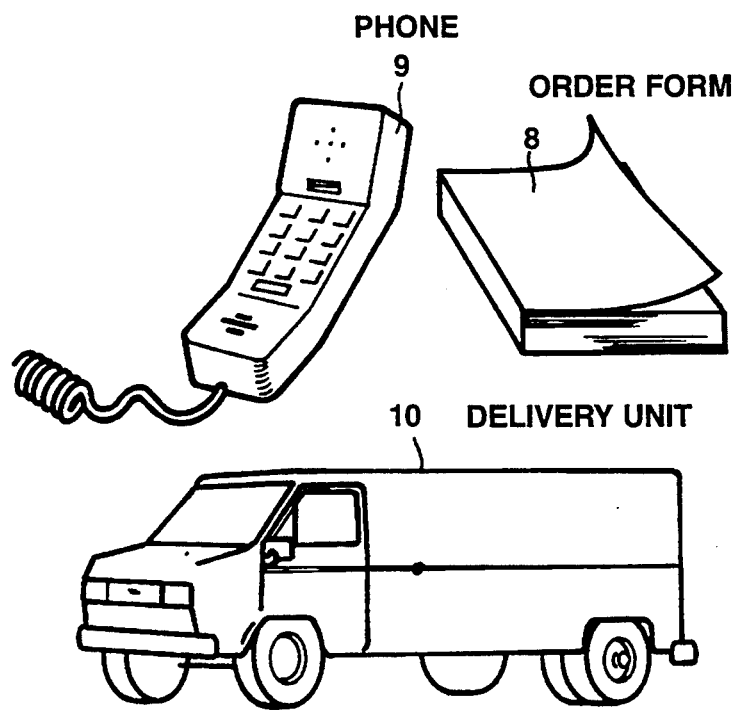
FIG. 2 is a schematic, composite perspective view of an optional push-button telephone, a printed order form, and an optional delivery vehicle according to one embodiment of the invention. A product identification in the order form may be called in to the merchandiser for delivery to the customer in the delivery vehicle.

Then, the merchandiser's order-taking, customer-invoicing, and product delivery programs are initiated. The customer's order is recorded, the customer is billed, the merchandiser is paid, the products are delivered, all according to state-of-the-art techniques. Optionally, the products may de delivered by the merchandiser's own delivery fleet, a unit 10 of which is depicted in FIG. 2.

Although this invention has been described above with reference to particular means, materials and embodiments, it is to be understood that the invention is not limited to these disclosed particulars, but extends instead to all equivalents within the scope of the following claims.

I claim:

1. A home shopping system which comprises:
    a video catalog containing a plurality of product images representing products available for purchase and containing product identification corresponding to each product image, the product images being for electronic display for viewing by a customer;
    an order form containing product identification which corresponds to the said product image in said video catalog, said order form comprising product names, and said order form being organized and indexed for quick reference by the customer by arranging the product names in alphabetical order with the corresponding product identification being listed beside each product name;
    means for indicating on said order form the product identification of the products desired for purchase from the products available for purchase; and
    means for transmitting said order form indicating the product identification of products desired for purchase to a merchandiser of said products.

2. The system of claim 1, wherein the video catalog contains product images that may be displayed as still images.

3. The system of claim 1, wherein the video catalog contains product images that may be displayed as moving images.

4. The system of claim 1, wherein the video catalog contains product images that may be displayed as a combination of still and moving images.

5. The system of claim 4, wherein the combination of still and moving images are adapted to depict the atmosphere and lay-out of the merchandiser's store.

6. The system of claim 1, wherein the means of transmitting said order form comprises electronic transmission.

7. The system of claim 1, further comprising a remote controller for controlling the electronic display of the product images of the video catalog.

8. A home shopping system which comprises:
- a video catalog containing a plurality of product images representing products available for purchase and containing product identification corresponding to each product image, the product images being for electronic display for viewing by a customer;
- an order form containing product identification which corresponds to the said product image in said video catalog, said order form comprising product names and product categories, and said order form being organized and indexed for quick reference by the customer by arranging the product categories in alphabetical order with the corresponding product names being listed alphabetically near the product categories and with the product identification being listed beside each product name;
- means for indicating on said order form the product identification of the products desired for purchase from the products available for purchase; and
- means for transmitting said order form indicating the product identification of products desired for purchase to a merchandiser of said products.

9. The system of claim 8, wherein the video catalog contains product images that may be displayed as still images.

10. The system of claim 8, wherein the video catalog contains product images that may be displayed as moving images.

11. The system of claim 8, wherein the video catalog contains product images that may be displayed as a combination of still and moving images.

12. The system of claim 11, wherein the combination of still and moving images are adapted to depict the atmosphere and lay-out of the merchandiser's store.

13. The system of claim 8, wherein the means of transmitting said order form comprises electronic transmission.

14. The system of claim 8, further comprising a remote controller for controlling the electronic display of the product images of the video catalog.

* * * * *